United States Patent
Hebenstreit et al.

(10) Patent No.: US 10,077,065 B2
(45) Date of Patent: Sep. 18, 2018

(54) STEERING COLUMN ASSEMBLY, CASING TUBE FOR A STEERING COLUMN ASSEMBLY, AND VEHICLE HAVING A STEERING COLUMN ASSEMBLY

(71) Applicant: Daimler AG, Stuttgart (DE)

(72) Inventors: Axel Hebenstreit, Stuttgart (DE); Hans-Dieter Loeffler, Reutlingen (DE); Markus Mauch, Aichwald (DE)

(73) Assignee: Daimler AG, Stuttgart (DE)

( * ) Notice: Subject to any disclaimer, the term of this patent is extended or adjusted under 35 U.S.C. 154(b) by 205 days.

(21) Appl. No.: 15/101,806

(22) PCT Filed: Dec. 4, 2014

(86) PCT No.: PCT/EP2014/003237
§ 371 (c)(1),
(2) Date: Oct. 18, 2016

(87) PCT Pub. No.: WO2015/082073
PCT Pub. Date: Jun. 11, 2015

(65) Prior Publication Data
US 2017/0029008 A1 Feb. 2, 2017

(30) Foreign Application Priority Data
Dec. 4, 2013 (DE) .......................... 10 2013 018 149

(51) Int. Cl.
*B62D 1/16* (2006.01)
*B60Q 5/00* (2006.01)

(52) U.S. Cl.
CPC ............... *B62D 1/16* (2013.01); *B60Q 5/003* (2013.01)

(58) Field of Classification Search
CPC .................................. B60Q 5/003; B62D 1/16
(Continued)

(56) References Cited

U.S. PATENT DOCUMENTS 5,306,032 A * 4/1994 Hoblingre ............... B62D 1/189
280/775
6,729,648 B2 * 5/2004 Ulintz .................... B62D 1/192
280/777
(Continued)

FOREIGN PATENT DOCUMENTS

DE 199 42 818 A1 3/2001
DE 20 2006 015 310 U1 1/2007
(Continued)

OTHER PUBLICATIONS

PCT/EP2014/003237, International Search Report dated Apr. 21, 2015 (Two (2) pages).

*Primary Examiner* — Toan C To
(74) *Attorney, Agent, or Firm* — Crowell & Moring LLP

(57) ABSTRACT

The invention discloses a steering column arrangement that has a steering spindle and a casing tube enclosing the steering spindle, which may be mounted to be rotatable about a longitudinal axis relative to the casing tube, and also has a switch module, which has a housing and a fastening sleeve provided on the housing. The fastening sleeve is designed such that the switch module with the fastening sleeve can be mounted on the casing tube and can be securely clamped to the casing tube. The casing tube on an outer circumferential surface has at least one radial projection, and the fastening sleeve on an inner circumferential surface has at least one extending guide groove when viewed in the longitudinal direction. The radial projection engages the guide groove when the switch module is mounted on the casing tube.

14 Claims, 2 Drawing Sheets

(58) Field of Classification Search
USPC .................................. 74/492, 493; 280/806
See application file for complete search history.

(56) References Cited

U.S. PATENT DOCUMENTS

| | | | |
|---|---|---|---|
| 7,992,464 B2 | 8/2011 | Hebenstreit et al. | |
| 8,132,828 B2 | 3/2012 | Wright | |
| 8,657,339 B2 * | 2/2014 | Yamamoto | B62D 1/16 280/777 |
| 2006/0243088 A1 * | 11/2006 | Cymbal | B62D 1/185 74/492 |
| 2007/0039403 A1 * | 2/2007 | Manwaring | B62D 1/192 74/492 |
| 2012/0118099 A1 * | 5/2012 | Bless | B62D 1/16 74/493 |

FOREIGN PATENT DOCUMENTS

| | | |
|---|---|---|
| DE | 602 12 312 T2 | 6/2007 |
| DE | 10 2007 060 631 A1 | 6/2009 |
| DE | 11 2009 002 198 T5 | 7/2011 |
| EP | 1 572 519 B1 | 9/2005 |

\* cited by examiner

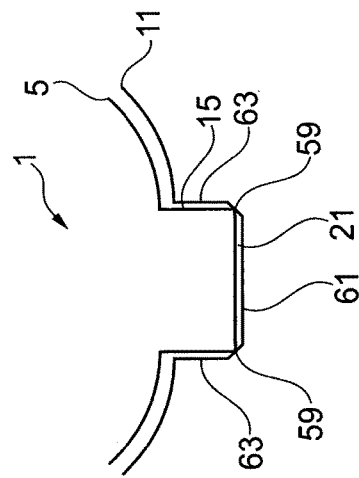
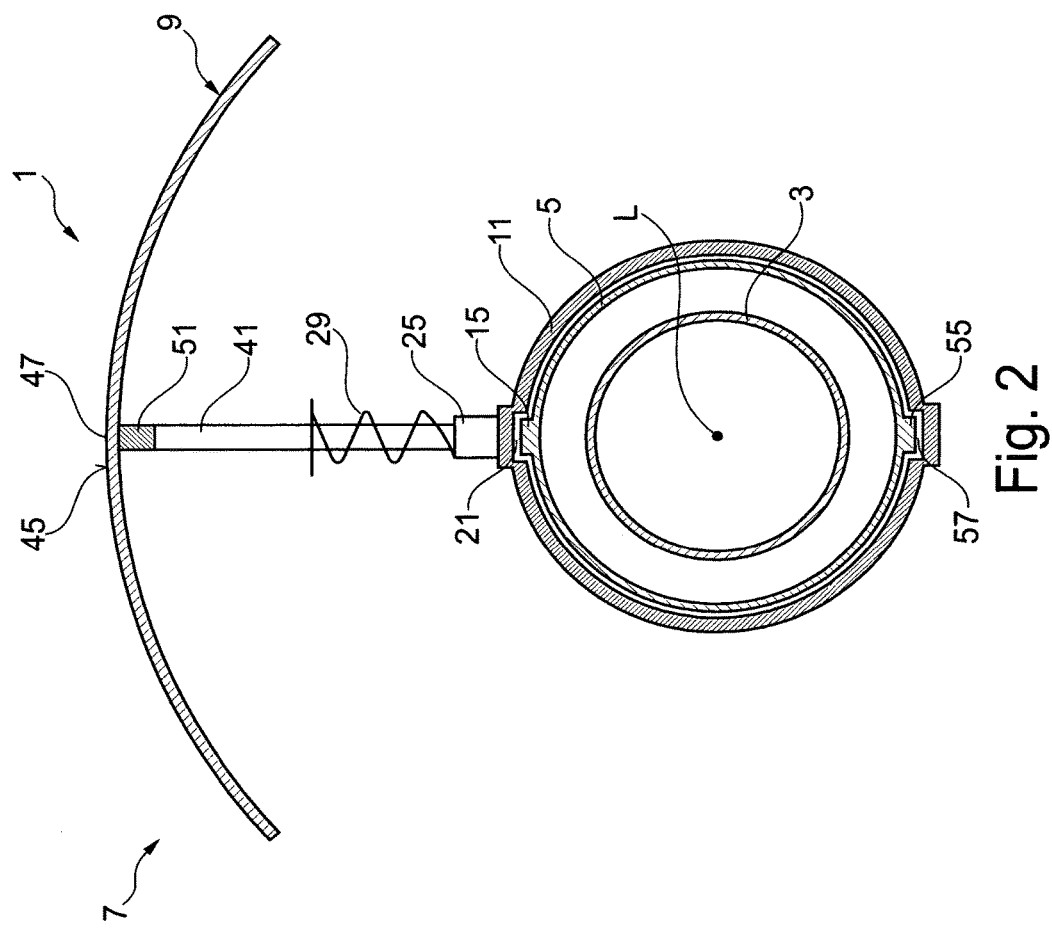

STEERING COLUMN ASSEMBLY, CASING TUBE FOR A STEERING COLUMN ASSEMBLY, AND VEHICLE HAVING A STEERING COLUMN ASSEMBLY

BACKGROUND AND SUMMARY OF THE INVENTION

One or more embodiments of the invention relate to a steering column arrangement, a casing tube for a steering column assembly, and a vehicle having a steering column assembly.

There are known steering column arrangements that have a steering spindle and a casing tube enclosing the steering spindle (from EP 1 572 519 B1 and DE 10 2007 060 631 A1). The steering spindle is mounted such that it can be rotated about a longitudinal axis relative to the casing tube. A switch module is provided, which typically has a housing and a fastening sleeve provided largely centrally on the housing in the form of a spring cage, and the fastening sleeve being compressible in the radial direction. The spring case encloses a plug-in opening of the housing for the casing tube, so that the switch module can be mounted on the latter and can be securely clamped to the casing tube. The plug-in opening of the housing is flush with the screw opening for a steering wheel bolt, which is screwed in coaxially in the housing from the side lying opposite the spring cage. An inner side of the housing limiting the plug-in opening is slightly widened conically in the direction of the casing tube, and lies on a negative-mold outer side of the spring cage. At its end facing the steering wheel, the spring cage has stop lugs extending radially inward, which impart a defined axial position to the cage when it is mounted on the casing tube. For installation, initially, the housing with the spring case is mounted on the casing tube, and then after mounting on the steering wheel, the steering wheel bolt is tightened, causing the housing to be displaced axially in the direction of the casing tube and relative to the spring case. Based on the conicity of the spring cage outer side and the housing inner inside, the displacement develops the effect of a wedge gear, where its springs grip the casing tube. In addition, small, knifelike projections are provided on the springs, which hook onto the projections. In that the switch module is fixed securely to the casing tube, axial fixation of the latter relative to the casing tube is achieved. In order to arrange the switch module even in a defined angle position—viewed in the circumferential direction—relative to the casing tube, spring-loaded arresting blocks are inset in the spring cage and submerge when the switch module is in plug-in position into axial, elongated holes of the casing tube. If the spring cage is compressed in the radial direction during installation, at the same time, the arresting blocks are also depressed into the elongated holes of the casing tube, assuring anti-twist locking of the switch module on the casing tube in the radial direction. Altogether, the switch module is thus arranged in a play-free manner on the casing tube viewed in the axial and the circumferential directions.

A disadvantage of the above-known steering column arrangements is that fact that the arresting blocks require a large installation space in the housing, so that at the same time, the installation space available for the casing tube is reduced. As result, the stiffness and the natural frequency of the casing tube is limited, which necessitates additional arrangements in order to assure steering comfort for the driver of a vehicle fitted with the steering column arrangement. Thus, if possible, no perceptible vibrations must arise.

Moreover, an anti-twist connection of a steering column switch with a fixed casing tube is known from DE 20 2006 015 310 U1. The known steering column switch has two protrusions axially arranged one behind the other that engage with two grooves of the switch housing, where one of the two protrusions serves as a positioning aid, while the other protrusion with the corresponding groove of the housing forms the largely play-free anti-twist lock. Outside of this connection area, the housing is pressed by means of a tensioning clamp against the casing tube such that an axial displacement of the housing in the direction of the end of the casing tube is prevented.

The present invention is directed a steering column arrangement, a casing tube, and a vehicle in accordance with one or more embodiments of the disclosure that do not have the above-described disadvantages and solve the above-problems. In particular, play-free and precisely aligned installation of a switch module on the casing tube should be possible, where the casing tube at the same time has adequately high stiffness and natural frequency in order to assure sufficient steering comfort for a vehicle driver.

The steering column arrangement has a steering spindle and a casing tube enclosing the steering spindle. The steering spindle is mounted such that it can be rotated about a longitudinal axis relative to the casing tube. Moreover, the steering column arrangement has a switch module that in turn has a housing and a fastening sleeve provided on the housing. The fastening sleeve is designed so that the switch module with the fastening sleeve can be mounted on the casing tube and securely clamped to the latter. The steering column arrangement includes the casing tube that has at least radial projection on an outer circumferential surface. Additionally, the fastening sleeve has on an inner circumferential surface at least one—viewed in the longitudinal direction—guide groove, the radial projection meshing with the guide groove when the switch module is mounted on the casing tube. The axial fixation of the switch module on the casing tube is carried out by securely clamping the fastening sleeve on the casing tube. Anti-twist locking is now effected, however, in that at least one projection provided on the casing tube, which projection projects from an outside circumferential surface of the latter, meshes with a guide groove, which is provided on an inner circumferential surface of the fastening sleeve. The fastening sleeve is preferably designed to be free of arresting blocks, which provide alignment in the circumferential direction. The function of the arresting blocks usually provided on the fastening sleeve or the spring cage now is assumed by the casing tube, in particular, by its at least one radial projection, so that the receiving spaces otherwise provided for the arresting blocks in the housing can be omitted. In at least that regard, the casing tube can be designed with a larger diameter, which allows a significant increase in stiffness and a rise in its natural frequency. The at least one projection on the casing tube can thus be made comparatively compact, and requires little installation space. The steering column arrangement of the disclosure implements a play-free and aligned connection between the switch module and the steering column that also withstands constantly high torques.

A longitudinal direction or an axial direction means a direction that runs parallel to the axis of rotation of the steering spindle, and preferably, coincides with the latter. A radial direction is vertical to the longitudinal direction. A circumferential direction means a direction which concentrically encloses the longitudinal direction.

Preferably, the steering column arrangement is provided for use in a vehicle, such as a motor vehicle. To this end, preferably a steering wheel can be connected to the steering spindle, in particular, can be mounted on a torque-transmitting structure of the steering spindle, for example gearing, and can be secured to the steering spindle with a steering wheel bolt.

In accordance with the invention, in addition, the guide groove—viewed in cross section—has a trapezoidal contour. As such, the side walls of the guide groove, extending in the longitudinal direction, at least in areas are not oriented in parallel to one another, but rather run transversely to one another, where their separation decreases radially outward, thus to larger radial separations from the longitudinal direction. The side walls of the guide groove are substantially oriented parallel to one another, where, however, at one end of the side walls a chamfer is provided at the groove base, so that in this area transverse wall segments result. The trapezoidal contour of the guide groove has the advantage that when there is compression of the fastening sleeve, the long sides or long edges of the projection, which run in the longitudinal direction of the casing tube, are clamped by the transverse side walls or the wall sections of the guide groove. This is a great advantage in comparison with the above-known arrangements, in which an arrester block held in the housing of the switch module engages a groove in the casing tube, because with such a solution, no corresponding clamping effect is attainable, so that radial play cannot be completely eliminated. On the contrary, only inadequate elimination of the radial play occurs. By way of the setup of the disclosure, the transverse side walls or wall sections on the elongated contour of the projection create a stiffer positioning of the switch module on the casing tube and thus also an increase in the natural frequency of the steering column arrangement.

In an exemplary embodiment of the steering column arrangement, the fastening sleeve is arranged on the housing, in particular secured to the latter. The housing is particularly designed as a plastic housing, the fastening sleeve preferably including a metal or a metal alloy, particularly including a metal or a metal alloy. Another exemplary embodiment is directed to the fastening sleeve that is designed as a single piece with the housing or as part of the housing.

In another exemplary embodiment of the steering column arrangement, the fastening sleeve—viewed in the radial direction—is compressible. Preferably, it is configured as a spring cage. In particular the fastening sleeve particularly is essentially cylindrical, where on a side facing toward the casing tube and facing away from the steering wheel, it has at least one longitudinal slot so that at least two spring tabs divided by the longitudinal slot are formed on the fastening sleeve. The spring tabs—viewed in the radial direction—can swivel. With the spring tabs, the fastening sleeve can be securely clamped to the casing tube. Toward this end, the fastening sleeve preferably has an inner diameter that is slightly larger than an outer diameter of the casing tube, so that the fastening sleeve can be mounted on the casing tube without clamping and then can be securely clamped on the latter by radial compression.

Alternatively, the fastening sleeve can carry at least two, preferably three or even more clamping jaws, with which the switch module can be securely clamped to the casing tube.

Preferably, the fastening sleeve has a stop at its end, which in plugged-in state faces a steering wheel, in particular at least one stop lug extending inward in the radial direction. The stop is provided in order to impart a defined axial position to the fastening sleeve during mounting on the casing tube. It is also possible that the fastening sleeve has an annular collar, which defines the stop on one end of the casing tube facing the steering wheel in plugged-in state. It is also possible that the fastening sleeve has multiple stop lugs, preferably at least three stop lugs.

The radial projection on the casing tube is preferably designed as a bump-like elevation. Moreover, the radial projection and the guide groove are preferably adapted to one another such that they already interlock with the casing tube during mounting of the fastening sleeve, so that the switch module on the casing tube is already secured in the circumferential direction before being securely clamped. In another example, the radial projection interlocks with the guide groove essentially play-free or entirely play-free, so that the switch module on the casing tube—viewed in the circumferential direction—has essentially no play or no play at all.

This freedom from play is very important, not only for the driver's steering comfort, but also essentially to assure the functionality of a steering angle sensor preferably integrated into the switch module. This is a substantial component of a fatigue recognition system preferably provided in the vehicle, which is designed to identify driver fatigue and to warn the driver in a timely manner. Therefore the arrangement of the switch module on the casing tube, as play-free as possible (preferably entirely play-free)—viewed in the circumferential direction—is also important for vehicle safety.

An exemplary embodiment of the steering column arrangement that is distinguished by the fact that the projection has an elongated shape is preferred. This means that the length of the projection in the longitudinal direction is greater than the length of the projection in the circumferential direction. The projection is thus longer than it is wide. Preferably its length is at least double that of its width or preferably at least three times. This ensures that forces directed into the projection acting in the circumferential direction are picked up reliably and stably by the latter, which increases the precision of the fixation of the switch module arrangement on the casing tube—viewed in the circumferential direction—and also increases the stiffness of the arrangement.

An exemplary embodiment of the steering column arrangement is also preferred that is distinguished by the fact that the projection is designed as a single piece with the casing tube. Preferably the projection is stamped on the outer circumferential surface, in particular stamped from the inner to the outer direction, partially punched, or molded. The projection may thus be presented on the casing tube in an especially simple and economical manner, without requiring additional method steps for installation of the projection and an extra logistical expense for storage and installation of separate elements.

In yet another exemplary embodiment of the steering column arrangement, the projection is alternatively secured as a separate element to the casing tube. In particular, the projection is soldered, welded, glued, or secured in some other suitable manner, or in particular to the outer circumferential surface of the projection. The projection may include plastic or is made of plastic, where in particular it is secured using a plastic spray or in particular on the outer circumferential surface, and consequently, it is sprayed on. The two-part embodiment of the casing tube and the projection allows a different material selection for these elements, so that the materials used can be adapted to different tasks and functionalities of the elements. Moreover, the shape of the projection may be defined even more precisely if the latter is made as a separate element, and subsequently joined to the casing tube or secured on the latter. Preferably, an exemplary embodiment of the steering column arrangement includes the casing tube that has at least two projections. This improves the support from forces acting in particular in the circumferential direction, and generally leads to a more stable connection between the casing tube and the switch module.

Preferably, at least two projections—viewed along a diameter line of the casing tube—are arranged opposite one another. The casing tube then has at least two diametrically opposite elevations. This has the advantage that torques directed from the switch module to the casing tube, or vice versa, are especially uniformly transmitted. Such an embodiment is especially preferred if a vehicle cockpit enclosing the steering column arrangement protrudes into the passenger space in such a way that installation of the switch module is possible only in one position, so that no further definition of the position is needed.

Additionally, the at least two projections are preferably arranged such that—when viewed in the circumferential direction—they are offset with respect to one another. Here, in particular—measured in the circumferential direction—they have an angle between them that differs by both 0 degrees and 180 degrees. This has the advantage, based on the offset and the symmetry calculation implemented, that only a single installation option for the switch module on the casing tube exists. If the casing tube includes more than two projections, these are generally preferably distributed asymmetrically over the circumference of the casing tube. Here, the two projections may be diametrically opposite one another, and a third projection may be provided with an offset. If exactly two projections are provided, they preferably have only a slight offset from the diametric arrangement, so that although owing to the symmetry calculation, only a single installation option exists; at the same time, uniform torque conduction from the switch module to the casing tube is ensured.

Alternatively, at least two projections are provided, where the projections—viewed in the longitudinal direction—are arranged offset from one another. There is thus—possibly additionally to offset in the circumferential direction and/or a diametric arrangement—a displacement provided in the longitudinal direction, so that there is an axial elongation of the support between the switch module and the casing tube. Forces or torques that arises are thus distributed over a longer length area from the switch module to the casing tube, or vice versa, causing generally better support and a stiffer arrangement.

Preferably, the fastening sleeve has at least two guide grooves, where a projection is assigned to each guide groove. The projections offset with respect to one another in the circumferential direction and/or longitudinal direction thus preferably each mesh with a guide groove of the fastening sleeve assigned to it—e.g., those lying opposite to it in the radial direction.

In another exemplary embodiment of the steering column arrangement, at least two projections are provided which—viewed in the longitudinal direction—are arranged behind one another without an offset in the circumferential direction, so that they interlock with the same guide groove of the fastening sleeve. This especially promotes elongated support of the switch module on the casing tube, causing especially high stiffness.

There is especially favorable fastening with high stiffness when a plurality of longitudinal projections are offset with respect to one another on the casing tube axially and/or in the circumferential direction, and interlock with the accordingly assigned guide grooves on the fastening sleeve. Preferably, at least two projections are provided that are offset with one another in pairs only in the longitudinal direction, but not in the circumferential direction. Moreover, preferably at least two projections are provided, which are offset in pairs with respect to one another only in the circumferential direction, but not in the longitudinal direction. Preferably, at least two projections are provided that are offset with respect to one another in pairs both in the circumferential direction and in the longitudinal direction.

In an exemplary embodiment, the guide groove—viewed in cross section—has a trapezoidal contour. This means that the side walls of the guide groove, extend in the longitudinal direction, at least in areas that are not oriented in parallel to one another run transversely to one another, where their separation decreases radially outward, thus to larger radial separations from the longitudinal direction. The side walls of the guide groove may be substantially oriented parallel to one another, where at one end of the side walls a chamfer is provided at the groove base, so that in this area transverse wall segments result. The trapezoidal contour of the guide groove has the advantage that when there is compression of the fastening sleeve, the long sides or long edges of the projection, which run in the longitudinal direction of the casing tube, are clamped by the transverse side walls or the wall sections of the guide groove. This is a great advantage in comparison with the known arrangement, in which an arrester block held in the housing of the switch module engages a groove in the casing tube, because with such a solution, no corresponding clamping effect is attainable, so that radial play cannot be completely eliminated. On the contrary, only inadequate elimination of the radial play occurs. The transverse side walls or wall sections on the elongated contour of the projection create a stiffer positioning of the switch module on the casing tube and thus also create an increase in the natural frequency of the steering column arrangement.

The clamping force on the projection—especially when there are a plurality of projections that are offset with respect to one another in the axial and/or in the circumferential direction—may be so great that further clamping by spring tabs of a spring cage is no longer needed. In particular, there is then no need for projections that are normally radially inward on the spring tabs, which hook onto the casing tube at points. Rather, only the creation of the compressible fastening sleeve with the guide grooves formed on it is necessary, where the clamping of the projections in the guide grooves effects a more stable and elongated support—viewed in the longitudinal direction—than is the case when the spring tabs are supported at points on projections that are arranged radially inward on them. Thus, not just fixation in the circumferential direction is improved and made free of play, but the axial fixation is also rendered more reliable and secure.

An exemplary embodiment of the steering column arrangement includes the switch module that has at least one arresting block, which interlocks from the radial outer direction with the at least one guide groove and—viewed in the radial direction—is displaceably mounted. Here, the arresting block is spring-loaded radially inward and thus, is along the longitudinal axis and preferably pre-tensioned, where it interacts with the projection for axial arresting of the switch module on the casing tube. Here, preferably, the at least one arresting block is held or mounted in the housing of the switch module. The arresting block in particular serves to prevent dropping from the casing tube during installation of the switch module. If the switch module is mounted on the casing tube, the arresting block, which preferably is held on the housing on the inside, prevents the switch module from falling out of the casing tube before it is securely clamped to the latter. Toward this end, preferably it is provided that the arresting block snaps behind at least one projection of the casing tube when pushing together the switch module and the casing tube. When they are pushed together, the arresting block, which is spring-loaded or pre-tensioned in the radial direction, is raised by the projection, where—viewed in the longitudinal direction—it falls back behind the projection to its relaxed or pre-tensioned additional position. Thus, generally it executes a radial stroke movement.

Preferably, a first transverse surface with relatively gentle slope is provided on the arresting elements to facilitate the lifting movement; preferably, the transverse surface is complementary with a front first contact surface of the projection. When the switch module is pushed onto the casing tube, the first transverse surface slides on the first contact surface, where the arresting element—viewed in the radial direction—is raised. On its side—viewed in the longitudinal direction—facing away from the first transverse surface, the arresting element preferably has a second transverse surface with a much steeper slope, which makes a withdrawal movement of the switch module from the casing tube more difficult. In addition, the projection preferably has on the side facing the arresting element in the plugged-in state an accordingly steeper second contact surface, so that generally plugging in the switch module is much easier than pulling it out. In this manner, by snapping the arresting element behind the projection, an at least first retention of the switch module on the casing tube is affected, before the switch module is securely clamped on the casing tube. Preferably, the switch module has a plurality of arresting elements, which interact with a plurality of projections for axial locking of the switch module on the casing tube.

In a preferred exemplary embodiment of the steering column arrangement, the arresting element is attached with a pin which—viewed in the radial direction—is displaceably guided in the housing. The pin is arranged and designed in such a way that it engages outward through a through-hole of the housing when the arresting element—viewed in the longitudinal direction—is arranged at the height of the projection, and that it does not engage through the through-hole when the arresting element—viewed in the longitudinal direction—is arranged in front of or behind the projection. Preferably, the arresting element is formed by an arresting block, on which a pin is secured at the top, which is guidably mounted in a bushing arranged on the inside of the housing or on a double bearing. The pin preferably has a stop which keeps it from dropping out of the bushing or bearing. Preferably, the pin has a compression spring which is supported on one side on the arresting block and on the other side on the bushing or the inner bearing of the double bearing.

The through-hole is configured on the housing of the switch module and is flush with the pin, and its diameter preferably is greater than the end of the pin opposite the arresting block. If the switch module is mounted on the casing tube and if the arresting element executes its radial stroke movement in contact with the projection, at the same time, the pin secured to the arresting element also executes a radial stroke movement. Here, the end of the pin passes through the through hole of the housing and from the outside becomes visible to a workman. Behind the projection—viewed in the longitudinal direction—the arresting block and thus also the pin again falls back into the housing when it snaps behind the projection. Preferably, the pin with its end facing away from the arresting element precisely aligns with through hole. Preferably, the end of the pin opposite the arresting element is color marked.

A workman who plugs the switch module onto the casing tube can thus see from the pin, hear from the snapping sound, and feel by touch when the right installation position, that is, the right relative position of the switch module with respect to the casing tube and thus also to the steering spindle, is achieved.

If the correct relative position is achieved, the switch module can be securely clamped to the casing tube.

The correct installation position can thus be reported to a worker by touch, by sound, and by appearance, without the use of additional fastening means or rotating installation parts.

In an exemplary embodiment of the steering column arrangement, the switch module has a wedge gear by way of which the fastening sleeve can be securely clamped to the casing tube. In this case, the housing preferably has a first wedge surface, where the fastening sleeve has a second wedge surface, and the wedge surfaces are arranged with respect to one another and oriented in such a way that the fastening sleeve is securely clamped to the casing tube when the housing, relative to the fastening sleeve and relative to the casing tube, is displaced in the direction of the longitudinal axis by an end of the steering spindle facing a steering wheel. The switch module can then be clamped on the casing tube, during which the workman mounts the steering wheel on the steering spindle and tightens the steering wheel bolt, and causes the above-described relative motion between the housing and the fastening sleeve, whereby the latter is radially compressed and thus clamped onto the casing tube. This preferably is carried out to the point of absolute absence of play—viewed in the circumferential and longitudinal direction—between the switch module and the casing tube.

The fastening sleeve is provided on the housing preferably such that it is displaceable relative to the housing, or in particular, is arranged on the housing or secured to it. In particular, the fastening sleeve and the housing are preferably connected to one another in such a way that—in the longitudinal direction—they are a relatively displaceable with respect to one another. In this case, a displacement of the housing relative to the fastening sleeve is possible, in which a first wedge surface of the housing slides onto a second wedge surface of the fastening sleeve, so that altogether a wedge gear is implemented, which radially compresses the fastening sleeve and thus is clamped on the casing tube.

Alternatively, another exemplary embodiment is directed to the switch module having a clamping ring for securely clamping the fastening sleeve. The clamping ring is then preferably arranged on an end of the fastening sleeve facing away from the steering wheel and is tightened securely in order to compress the fastening sleeve—viewed in the radial direction—and securely clamp it to the casing tube. In one exemplary embodiment of the steering column arrangement, in which a clamping ring is provided for securely clamping the fastening sleeve, the fastening sleeve may be securely fastened to the housing, and in particular, may be connected to the latter in such a way that no relative displacement is possible between the housing and the fastening sleeve. In particular, it can be secured in a single piece with the housing or rigidly secured to the latter by screwing or in some other suitable manner. In this case, no relative displacement between the housing in the fastening sleeve is needed, because the fastening sleeve is radially compressed by the clamp ring and securely clamped to the casing tube.

The problem is also solved by creating a casing tube in accordance with one or more features of the disclosure. The casing tube is in particular configured for use in a steering column arrangement in accordance with one of the above-described exemplary embodiments. For example, the casing tube has at least one radial projection on an outside circumferential surface. The projection preferably is longitudinal. Here, the advantages already described in connection with the steering column arrangement with regard to the casing tube are implemented.

Additionally, the problem is solved by creating a vehicle in accordance with one or more features of the disclosure. The vehicle includes a steering column arrangement in accordance with one of the above-described exemplary embodiments. Here, the advantages already described in connection with the steering column arrangement are implemented in connection with the vehicle. The vehicle preferably is a motor vehicle.

BRIEF DESCRIPTION OF THE DRAWINGS

The invention is described in more detail below with reference to the drawings.

FIG. 2 discloses a schematic transverse section view of a second exemplary embodiment of the steering column arrangement; and FIG. 3 discloses a schematic detailed view of a third exemplary embodiment of the steering column arrangement.

DETAILED DESCRIPTION OF THE DRAWINGS

Figure 1:
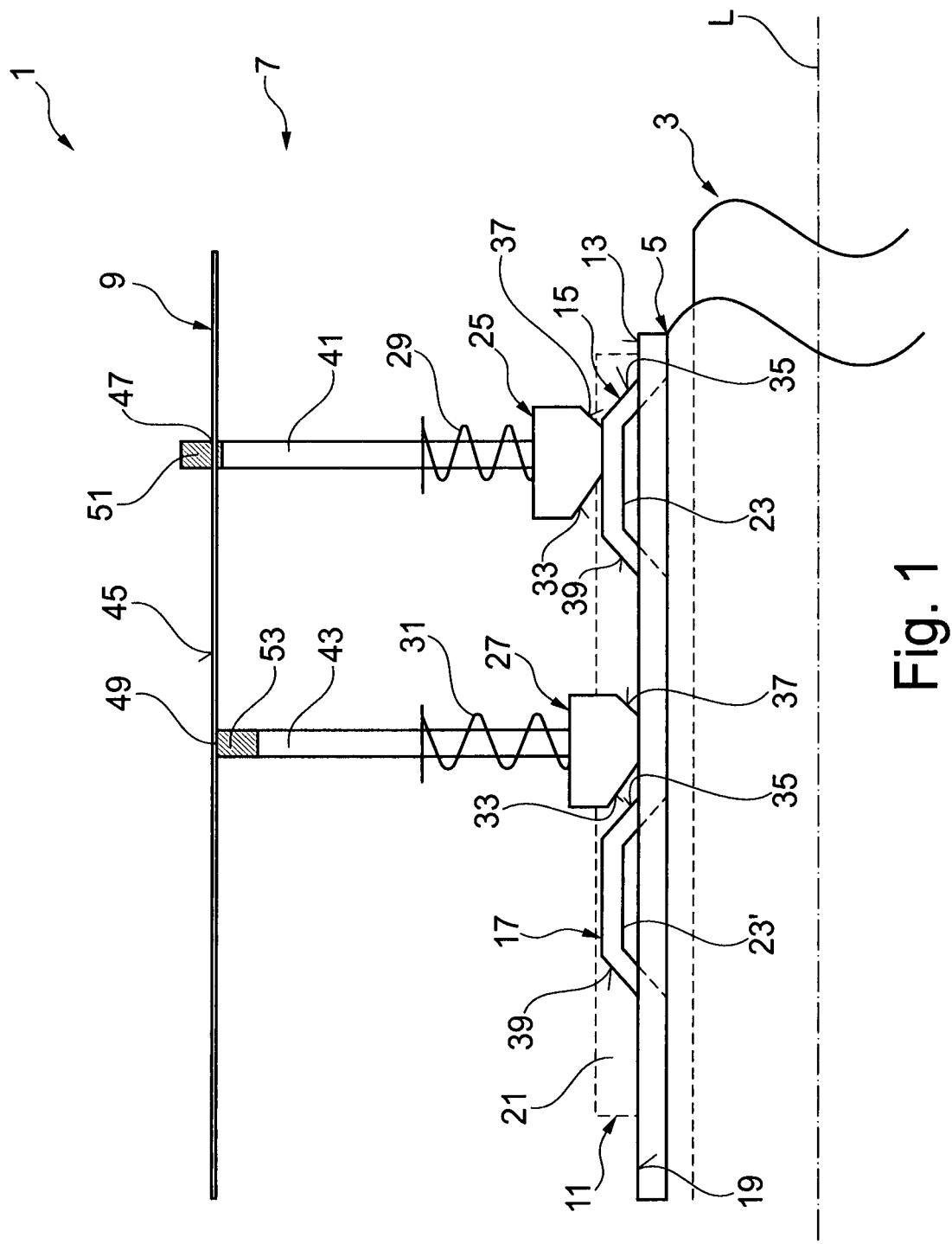
FIG. 1 discloses a schematic longitudinal section view of a first exemplary embodiment of a steering column arrangement.

FIG. 1 shows a schematic longitudinal section depiction of a first exemplary embodiment of a steering column arrangement 1. The steering column arrangement 1 has a steering spindle 3 and a casing tube 5, the casing tube 5 enclosing the steering spindle 3 when viewed in the circumferential direction.

The steering spindle 3 is mounted so as to be rotatable about a longitudinal axis L relative to the casing tube 5. Preferably, the casing tube 5 is fixedly arranged, where the steering spindle 3 is mounted in the latter and can be rotated about the longitudinal axis L relative to the casing tube 5. Here, the steering spindle 3 may be rotatably mounted in the casing tube 5. Alternatively, the steering spindle 3 may be rotatably mounted on some other part, in particular on a part of the vehicle which has the steering column arrangement 1. The casing tube 5 is preferably supported on a part of the vehicle which has the steering column assembly 1 so that it is held there in a fixed position.

The steering column arrangement 1 in addition has a switch module 7, which has a housing 9 and a fastening sleeve 11 arranged on the housing 9. The fastening sleeve 11 viewed in the radial direction, and consequently in a direction vertical to the longitudinal axis L, is compressible at least in some areas, and is configured such that the switch module 7 with the fastening sleeve 11 can be mounted on the casing tube 5 and securely clamped to same. To this end, the fastening sleeve 11 preferably has an inner diameter that is slightly larger than the outer diameter of the casing tube 5, so that the fastening sleeve 11 can be pushed over the casing tube 5. If the fastening sleeve 11 is compressed in some areas, its inner diameter is reduced in the compressed area, so that the fastening sleeve 11 is clamped onto the casing tube 5. In this way, in particular an axial fixation of the switch module 7 relative to the casing tube 5 can be established.

The fastening sleeve 11 is preferably secured to the housing 9. In an exemplary embodiment, the fastening sleeve 11 is provided in a single piece with the housing 9. Preferably, the fastening sleeve 11 in a largely central position on the housing 9, where preferably a center of gravity of the switch module 7 and in particular also of the housing 9 lies approximately on the longitudinal axis L.

Preferably, the fastening sleeve 11 encloses a plug-in opening the housing 9 for the casing tube 5. The plug-in preferably is flush with a screw opening for a steering wheel bolt, which can be coaxially screwed from a side opposite the plug-an opening into the housing 9 order to secure a steering wheel on the steering spindle 3. Here, the steering wheel bolt preferably interacts with the housing 9 in order to fix the switch module 7 on the casing tube 5.

Preferably it is provided that an inner circumferential surface of the housing 9 is configured so as to be slightly conically widened toward the casing tube 5, where it lies against a mold-negative outer circumferential surface of the fastening sleeve 11. If the steering wheel bolt is tightened, it pushes the housing 9 preferably in the direction of the longitudinal axis L in such a way that based on the conicity of the outer circumferential surface of the fastening sleeve 11 and the inner circumferential surface of the housing 9, the effect of a wedge gear is created, by which the fastening sleeve 11 is compressed at least in areas and clamped to the casing tube 5.

The casing tube 5 has on an outer circumferential surface 13 at least one radial projection, here a first radial projection 15, as well as a second radial projection 17, where the radial projections 15, 17 extend from the outer circumferential surface 13 in a radial direction from the longitudinal axis L. They thus project from the outer circumferential surface 13 radially toward the outside.

The fastening sleeve 11 has on an inner circumferential surface 19 at least one—viewed in the longitudinal direction—guide groove 21. Here, the radial projections 15, 17 engage with the guide groove 21 when the switch module 7 is mounted on the casing tube 5. Here, the guide grooves 21 are adapted to the radial projections 15, 17 such that—viewed in the circumferential direction—there is a play-free arrangement of the switch module 7 on the casing tube 5.

A circumferential direction is understood to be a direction that concentrically encloses the longitudinal axis L.

By engagement of the radial projections 15, 17 with the guide groove 21, it may be ensured (efficiently and in a play-free manner) that the switch module 7 does not twist relative to the casing tube 5. In this way, the switch module is fixedly mounted, where the steering spindle 3 generally is rotatably mounted relative to the casing tube 5 and to the switch module 7. The play-free arrangement of the switch module 7 on the casing tube 5 here is not least of all decisive for the functionality of a steering angle sensor integrated in switch module 7, which steering angle sensor is an essential component of a fatigue recognition system preferably integrated into a vehicle. Moreover, the freedom from play is important for the steering comfort of the vehicle driver.

For fixing of the switch module 7 on the casing tube 5 in the circumferential direction, in conventional steering column arrangements 1, typically arresting blocks are integrated into the housing 9, which engage with grooves on the casing tube 5. However, these require a relatively large installation space in the housing 9, so that the casing tube 5 must be configured with a small diameter.

The steering column arrangement 1, however, is free of such arresting blocks mounted in the housing 9 to help fix the switch module 7 in the circumferential direction. Therefore, the installation space required for them is saved and only the guide groove 21 has to be provided on the housing 9. The radial projections 15, 17 that serve for fixation in the circumferential direction are rather provided on the casing tube 5, so that the latter can be made larger than presently known. In this way, its stiffness and natural frequency are increased, which reduces perceptible vibrations for the driver and therefore enhances steering comfort. At the same time, the stiffer configuration of the steering column arrangement 1 can also improve the safety of the vehicle and its occupants.

In a preferred exemplary embodiment, the projections 15, 17 are molded, punched, or stamped on the outside circumferential surface 13. Also, the projections 15, 17 may be secured to the casing tube 5 as separate elements, where they may be soldered, welded, glued, or sprayed to the outer circumferential surface 13.

There are two projections 15, 17, provided on the casing tube 5 in the exemplary embodiment shown in FIG. 1, which when viewed in the longitudinal direction are offset with respect to one another and in particular are arranged axially behind one another, where they engage with the same guide groove 21. This improves and intensifies a clamping effect of the fastening sleeve 11 on the casing tube 5 and increases the stiffness of the steering column arrangement 1 as well as the play-free arrangement by elongation of the support and guidance of the switch module 7 on the casing tube 5.

Additionally, at least a third projection is provided, which is arranged in an offset position relative to the projections 15, 17—viewed in a circumferential direction—in particular viewed along a diameter line opposite or slightly offset from the 180 degree position, in order to impart an unequivocal installation position for the switch module 7 on the casing tube 5. Here, the fastening sleeve 11 preferably has a guide groove also for this at least one further projection, which guide groove extends in the longitudinal direction and with which the at least one further projection engages. By way of example only, FIG. 1 shows two additional radial projections 23, 23'. These are—viewed in the circumferential direction—relatively offset with respect to the radial projections 15, 17, but both relative to one another in the same angle position, so that they engage with a common additional guide groove (not shown) on the fastening sleeve 11. Here, the additional projections 23, 23'— viewed in the longitudinal direction—are not offset with respect to the first and second radial projections 15, 17. In another exemplary embodiment, additional projections are provided that are offset both axially and in the circumferential direction.

The switch module 7 has at least one arresting element, where FIG. 1 shows two arresting elements 25, 27. These engage from the radial outside position (in FIG. 1 from above) with the guide groove 21 and are retained in the housing 9, when viewed in the radial direction, in a displaceable manner. The arresting elements 25, 27 are spring-loaded by means of the compression springs 29, 31 radially inward, and thus toward the longitudinal axis L, and preferably pre-tensioned, where the compression springs 29, 31 are supported on one side in the housing 9 and on the arresting elements 25, 27 on the other. The arresting elements 25, 27 interact with the projections 15, 17 in order to arrest the switch module 7 on the casing tube 5. Here, when the switch module 7 is pushed onto the casing tube 5—in FIG. 1 from right to left—they snap in behind the projections 15, 17. If the switch module 7 is pushed onto the casing tube 5, the arresting elements 25, 27 slide past the projections 15, 17, in the process being raised by the latter and because of the pre-tensioning by the compression springs 29, 31, drop back behind the projections 15, 17—in FIG. 1 therefore left of the latter—to their relaxed or pre-tensioned initial position in the guide groove 21.

When the fastening sleeve 11 has more than one guide groove 21, preferably at least one arresting element 25, 27 is provided in each guide groove.

Preferably, the arresting elements 25, 27—viewed in the push-on direction onto casing tube 5—on their side facing the projections 15, 17, have a first transverse surface 33, which has a relatively small slope, and encloses a comparatively small angle with the longitudinal axis L, and this facilitates the radial stroke movement of the arresting elements 25, 27 when the switch module 7 is pushed onto the casing tube 5. Preferably, the projections 15, 17 each have a first contact surface 35 facing the first transverse surfaces 33, which contact surface like the first transverse surfaces 33 has a comparatively gentle slope. Preferably, the slopes of the first contact surfaces 35 are adapted to the slopes of the first transfer surfaces 33, so that they slide onto one another in the sense of a wedge gear, causing an especially light stroke movement of the arresting elements 25, 27 in the region of the projections 15, 17 when the switch module 7 is pushed onto the casing tube 5.

On one side facing away from the first transverse surfaces 33, the arresting elements 25, 27 each have a second transverse surface 37, which has a steeper slope than the first transfer surfaces 33, in particular encloses a larger angle with the longitudinal axis L. Thus, a withdrawal movement of the switch module 7 from the casing tube 5 counter to the push-on direction—from left to right in FIG. 1—is more difficult as soon as the arresting elements 25, 27 snap behind the projections 15, 17 to the left of the latter in FIG. 1.

Preferably, the projections 15, 17 have second contact surfaces 39, each turned away from the first contact surfaces 35, which preferably likewise have a steeper slope than the first contact surfaces 35. It is preferred that the second contact surfaces 39 do not match the second transverse surfaces 37 in terms of slope, so that no two-dimensional wedge gear is created, but rather only a linear contact, which impedes the withdrawal movement of the switch module 7 from the casing tube 5.

FIG. 1 shows the switch module 7 when it is pushed onto the casing tube 5, where the second arresting element 27 is not yet engaged with the second projection 17, and the first arresting element 25 is just sliding over the first projection 15 and is displaced by the latter to its raised position.

The housing 9 is arranged in its locked-in position on the casing tube 5 when both arresting elements 25, 27 behind the projections 15, 17—thus in FIG. 1 to the left of the latter— have dropped back to their initial position in the guide groove 21.

By way of the arresting elements 25, 27 interacting with the projections 15, 17, the dropping or unintended removal of the switch module 7 from the casing tube 5 before the fastening sleeve 11 is clamped onto the casing tube 5 is prevented.

The arresting elements 25, 27 are configured as arresting blocks, to each of which a pin 41, 43 is secured radially on the outside—at the top in FIG. 1. The pins 41, 43 are preferably retained and guided in a bushing (not shown) provided on the housing 9 or on a double bearing—displaceable in the radial direction. Here, the pins 41, 43 each have a stop, which is not shown, which prevents dropping out of the bushing or the double bearing. The pins 41, 43 hold the compression springs 29, 31, which preferably are configured as coil springs and which enclose the pins 41, 43. Here, the compression springs 29, 31 preferably are supported on one side on the arresting elements 25, 27, in particular on the arresting blocks, and on the other side on the bushing or on an inner bearing of the double bearing.

On the housing 9, the through holes 47, 49 are arranged on an outside surface 45, which through holes are flush with the pins 41, 43, where the latter preferably can engage through the through holes 47, 49. To this end, the inner diameters of the through holes 47, 49 preferably are a slightly larger than the ends 51, 53 of the pins 41, 43 facing away from the arresting elements 25, 27.

If the arresting elements 25, 27 execute their radial stroke movement when the switch module 7 is pushed onto the casing tube 5 in the region of the projections 15, 17, the pins 41, 43 follow this stroke movement of the elements 25, 27. Here, the free ends 51, 53 of the pins 41, 43 submerge through the through holes 47, 43, causing the ends 51, 53 to become visible for a time from outside, meaning from outside the housing 9, by protruding over the outer surface 45. In order to increase the visibility of the ends 51, 53, these are marked in color. Viewed in the push-on direction, the arresting elements 25, 27 drop back behind the projections 15, 17 to their relaxed or pre-tensioned initial position in the guide groove 21, so that the pins 41, 43 also drop back into the housing 9. Preferably, in this position the ends 51, 53 align precisely with the outer surface 45.

FIG. 1 shows that the first end 51 of the first pin 41 projects right over the outer surface 45, because the first arresting element 25 slides on the first projection 15, and to this extent is radially raised by the latter. The second arresting element is arranged in its relaxed or pre-tensioned position in the guide groove 21, and not yet engaged with the second projection 17. Therefore, the second end 53 of the second pin 43 is also not positioned over the outer surface 45, but in the second through-hole 49 is arranged in alignment with the outer surface. It is understood that FIG. 1 is exemplary. Preferably, the arresting elements 25, 27 and the projections 15, 17 are arranged in the region of a common guide groove 21 in such a way that the arresting elements 25, 27 engage simultaneously with the projections 15, 17, slide over the latter, and snap in behind them. Here, preferably a locked-in position is implemented in which all arresting elements 25, 27 are arranged securely directly behind the projections 15, 17 and are in contact with the latter, so that in the installed position of the switch module 7, there is a defined and stable locked-in position for all arresting elements 25, 27. In another exemplary embodiment, the arresting elements 25, 27 and the projections 15, 17 of guide groove 21 may be arranged relatively to one another as shown in FIG. 1, or in some other way.

By way of the mechanism of the pins 41, 43 and their ends 51, 53 interacting with the arresting elements 25, 27, a worker mounting the switch module 7 on the casing tube 5 can see, hear, and even feel when the right installation position of the switch module 7 on the casing tube 5 is achieved. In particular, the ends 51, 53 projecting over the outer surface 45 are not only optically visible, but also haptically perceptible.

If the correct installation position is reached, and the switch module 7 is snapped onto the casing tube 5 by way of the arresting elements 25, 27, the worker can place and secure the steering wheel, where the steering wheel bolt is tightened. Here, preferably at the same time the fastening sleeve 11 is also clamped to the casing tube 5, until absolute absence of play is achieved. Alternatively, the fastening sleeve 11 may be clamped to the casing tube 5 by way of a clamping ring, the clamping ring preferably being provided on an end of the fastening sleeve 11 facing away from the steering wheel.

FIG. 2 shows a schematic cross-sectional view of a second exemplary embodiment of the steering column arrangement 1. Similar and functionally similar elements are provided with the same reference symbols, so that in this respect reference is made to the previous description. This shows in particular how the projection 15 engages the guide groove 21, causing the fastening sleeve 11 of the casing tube 7—viewed in the circumferential direction—to be securely fastened to the casing tube 5.

In the second exemplary embodiment, a further projection 55 is provided on the casing tube 5, where the latter engages with the corresponding guide groove 57 of the fastening sleeve 11. Here, it is evident that the projections 15, 55 are arranged diametrically opposite one another. This brings about a very uniform conduction of torques from the switch module 7 into the casing tube 5 or vice versa. At the same time, however, two different installation positions of the switch module on the casing tube 5 are possible. This is harmless when, for other reasons, for example, based on the arrangement of the switch module in a cockpit of the vehicle in which the steering column arrangement 1 is used, only one arrangement of the switch module is possible.

In order to allow the positioning of the switch module 7 on the casing tube 5, in another exemplary embodiment, it is preferably provided that the additional projection 55 does not lie diametrically opposite the first projection 15, but when viewed in the circumferential direction, it is arranged in a somewhat offset position relative to the opposite position, so that the rotational symmetry about the longitudinal axis L is broken by the projections 15, 55. Then, the guide groove 57 on the fastening sleeve 11 is accordingly offset, so that ultimately only one possible installation position of the switch module 7 on the casing tube 5 results.

On the casing tube 5, additional projections may be provided, and additional corresponding guide sleeves may be provided on the fastening sleeve 11, which—viewed in the circumferential direction—can be arranged either symmetrically or asymmetrically.

The lateral separation between the side walls of the guide groove 21 and the projection 15 as well as between the guide groove 57 and the projection 55 is shown in FIG. 2 with exaggerated size. In reality, the dimensions of the guide grooves 21, 57 and the projections 15, 55 are adapted to one another such that in any case with clamped condition of the fastening sleeve 11 on the casing tube 5, there is a play-free arrangement of the switch module 7.

In order to entirely eliminate the play of the switch module 7 on the casing tube 5—in the circumferential direction—the guide grooves 21, 57 preferably have a trapezoidal contour with side walls arranged transversely to one another, so that upon compression of the fastening sleeve 11, the longitudinal sides of the projections 15, 55, which run in the longitudinal direction of the casing tube 5, are clamped by the transverse side walls of the guide grooves 21, 57.

Instead of generally transverse side walls, the guide grooves 21, 57 may have canted edges, e.g., chamfers.

FIG. 3 schematically shows a third exemplary embodiment of the steering column arrangement 1. Similar and functionally similar elements are provided the same reference symbols, so that in this respect reference is made to the prior description. The guide groove 21 has one chamfer 59 between a groove base 61 and the side walls 63 extending in the longitudinal direction—vertically to the plane of the image in FIG. 3. With the transverse wall sections or chamfers 59, the guide groove 21 is clamped on the projection 15 when there is radial compression of the fastening sleeve 11, so that ultimately there is no play for the casing tube 5 in the fastening sleeve 11 or for the fastening sleeve 11 on the casing tube 5.

Preferably, each guide groove 21 of the fastening sleeve 11 has such a trapezoidal contour or transverse side walls or chamfers 59. Especially stiff positioning of the switch module 7 on the casing tube 5 is achieved, and thus an increase in the natural frequency of the steering column arrangement 1.

The steering column arrangement 1 creates in a simple manner an anti-twist lock of the switch module 7 on the casing tube 5, by way of which increased stiffness and natural frequency of the casing tube 5 is achieved. This produces a robust fastening, which also withstands high torques. Here, the steering column arrangement 1 can be integrated without changes in the existing installation processes.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A steering column arrangement comprising:
a steering spindle and a casing tube enclosing the steering spindle, wherein the steering spindle is mounted so as to be rotatable about a longitudinal axis relative to the casing tube,
a switch module having a housing and a fastening sleeve provided on the housing, wherein the fastening sleeve with the switch module is mountable onto the casing tube and is securely clampable to the casing tube,
wherein the casing tube, on an outer circumferential surface of the casing tube, has at least one radial projection,
wherein the fastening sleeve, on an inner circumferential surface of the fastening sleeve, has at least one extending guide groove viewed in a longitudinal direction,
wherein the radial projection engages with the guide groove when the switch module is mounted on the casing tube, and
wherein the guide groove, viewed in cross section, has a trapezoidal contour, wherein the guide groove with transverse side walls or wall segments is clamped on long sides or long edges of the projection running in a longitudinal direction of the casing tube when the steering wheel is mounted on the steering spindle.

2. The steering column arrangement according to claim 1, wherein the radial projection has an elongated shape.

3. The steering column arrangement according to claim 1, wherein the radial projection is a single piece with the casing tube, wherein the projection is stamped, partially punched, or molded on the outer circumferential surface.

4. The steering column arrangement according to claim 1, wherein the casing tube has at least two radial projections, wherein the projections, viewed along a diameter line, are arranged opposite one another.

5. The steering column arrangement according to claim 1, wherein the switch module has at least one arresting element, which from the radial outer position, engages the at least one guide groove and, viewed in the radial direction, is displaceably mounted, and wherein the arresting element is radially spring-loaded inward, and interacts with the projection for axial locking of the switch module on the casing tube.

6. The steering column arrangement according to claim 5, wherein the arresting element is connected to a pin, which, viewed in the radial direction, is guided in a displaceable manner in the housing, wherein the pin is arranged and configured such that the pin engages outwardly through a through-hole of the housing when the arresting element, viewed in the longitudinal direction, is arranged at the height of the projection, and the pin does not engage through the through-hole when the arresting element, viewed in the longitudinal direction, is arranged before or after the projection.

7. The steering column arrangement according to claim 5, wherein the arresting element is pre-tensioned.

8. The steering column arrangement according to claim 1, wherein the casing tube on the outer circumferential surface has at least one elongated, radial projection.

9. A vehicle having the steering column arrangement according to claim 1.

10. The vehicle according to claim 9, wherein the vehicle is a motor vehicle.

11. The steering column arrangement according to claim 1, wherein the projection is secured as a separate element on the casing tube, and is soldered, welded, glued, or sprayed on the casing tube.

12. The steering column arrangement according to claim 1, wherein the casing tube has at least two radial projections, wherein the projections, viewed in a circumferential direction, offset with respect to one another.

13. The steering column arrangement according to claim 1, wherein the casing tube has at least two radial projections, wherein the projections, viewed in the longitudinal direction, are arranged offset from one another, wherein the fastening sleeve has at least two guide grooves, and wherein each guide groove is assigned at least one projection.

14. The steering column arrangement according to claim 1, wherein the switch module has a clamping ring for securely clamping the fastening sleeve on the casing tube.

* * * * *